United States Patent [19]

Kim

[11] Patent Number: 5,323,369
[45] Date of Patent: Jun. 21, 1994

[54] OBJECTIVE LENS DRIVING APPARATUS DESIGNED TO MINIMIZE ROLLING EFFECTS OF AN OPTICAL PICK-UP

[75] Inventor: Chun-dong Kim, Kyungki-do, Rep. of Korea

[73] Assignee: SamSung Electronics Co., Ltd., Kyungki-do, Rep. of Korea

[21] Appl. No.: 918,688

[22] Filed: Jul. 27, 1992

[30] Foreign Application Priority Data

Jul. 27, 1991 [KR] Rep. of Korea ................. 91-12980

[51] Int. Cl.$^5$ ............................................. G11B 7/00
[52] U.S. Cl. ........................... 369/44.15; 369/44.11; 369/44.14
[58] Field of Search .............. 369/44.15, 44.11, 44.14, 369/44.16; 360/104, 109, 77.16

[56] References Cited

U.S. PATENT DOCUMENTS 4,646,283  2/1987  Ito et al. ...................... 369/44.15

FOREIGN PATENT DOCUMENTS 119027   5/1988  Japan ................................ 369/44.15
222336   9/1988  Japan ................................ 369/44.15
2130730  5/1990  Japan ................................ 369/44.15

Primary Examiner—Andrew L. Sniezek
Assistant Examiner—Duncan Wilkinson
Attorney, Agent, or Firm—Robert E. Bushnell

[57] ABSTRACT

An objective lens driving apparatus for an optical pick-up, in which an objective lens is loaded on a driving body which is driven in a horizontal and a vertical direction and an objective lens driving portion is supported by four elastic linear members, includes two supports having two penetration holes each through which two pairs of elastic linear members pass, wherein the objective lens driving body is connected to the two pairs of elastic linear members, so as to prevent the driving body from rolling.

11 Claims, 3 Drawing Sheets

OBJECTIVE LENS DRIVING APPARATUS DESIGNED TO MINIMIZE ROLLING EFFECTS OF AN OPTICAL PICK-UP

BACKGROUND OF THE INVENTION

The present invention relates to an objective lens driving apparatus for use in an optical pick-up which is installed in a light recording and/or reproducing system, and more particularly to an improved objective lens driving apparatus in which the structure of a supporting mechanism, for elastically supporting an objective lens driving portion, is improved so as to perform a precise servo control of an objective lens.

Generally, optical pick-ups for projecting a light beam from a laser, etc. onto the surface of a recording medium and detecting the reflected light beam are installed in players using light recording media such as a laser disc player (LDP), a compact disc player (CDP), a multi-disc player (MDP) for a mageneto-optic disc drive (MODD), and so on. Such optical pick-ups for optical discs are apparatuses for reading out digital information stored on the surfaces of the disc in which the reading method is completed by scanning a disc with a laser beam and reading a binary signal via the reflected beam.

Thus, when using an optical pick-up for an optical disc, in order to read the signals correctly, the focus of the objective lens must be controlled accurately. Accordingly, elastic supporting means is provided in the objective lens driving portion, so that the main body of the driving portion is minutely moved in the horizontal direction for tracking and in the vertical direction for focusing.

As shown in FIG. 1, the conventional objective lens driving apparatus disclosed in U.S. Pat. No. 4,646,283 of Matsushita Electric Industrial Co. (Japan), includes four conductive elastic linear members W1 to W4 for connecting both sides of a main body 1 in the driving portion on which an objective lens L is loaded, to the front plate of a nonconductive fixed block 2, thereby elastically supporting main body 1 of the driving portion in the horizontal and vertical directions. Here, conductive elastic linear members W1 to W4 are of the same size and each have respective elasticities of a predetermined direction. Also, conductive elastic linear members W1-W4 pass through fixed block 2 for support, and at the same time are connected to an external circuit (not shown). That is, the above Matsushita patent teaches a technology of supporting the objective lens driving portion as well as supplying current to coils, using the conductive elastic linear members.

In the objective lens driving apparatus having the above construction, when driving portion main body 1 moves in the vertical direction for focusing, parts of tracing coils Tc, which are wound in driving portion main body 1, depart from the magnetic field. At this time, since differences occur between the electromagnetic forces generated in the tracing coils within the magnetic field and those outside the magnetic field, a rolling force is produced in the driving portion main body. Accordingly, elastic linear members W1-W4 twist due to this rolling force.

Thus, as shown in FIG.2, vertically disposed elastic linear member pairs W1 and W2 and W3 and W4 experience a twisting action, caused by the rolling of driving portion main body 1. For this reason, the light beams via objective lens L are obliquely scanned on a recording medium (not shown), which causes imprecise servo control.

Certain improvements have been proposed in an attempt to prevent driving portion main body 1 (on which objective lens L is loaded) from rolling, which include modifying the structure of tracking coils Tc. However, such modifications lead to a complicated structure, a rise in production cost and greater power consumption.

SUMMARY OF THE INVENTION

Therefore, to solve the defects as described above, it is an object of the present invention to provide an improved objective lens driving apparatus capable of performing a precise position control by preventing a driving body from being rolled due to a rolling force caused by the departure from a magnetic field of parts of the tracking coils, when the driving body moves in a horizontal and/or vertical direction.

To accomplish the above object of the present invention, there is provided an objective lens driving apparatus for an optical pick-up in which an objective lens is loaded on a driving body which is driven in a horizontal and/or vertical direction, and an objective lens driving portion is supported by four elastic linear members, comprising:

supporting means having two penetration holes through which a pair of vertically or horizontally disposed elastic linear members pass, wherein the objective lens driving body is connected to the pair of vertically or horizontally disposed elastic linear members, so as to prevent the driving body from rolling.

BRIEF DESCRIPTION OF THE DRAWINGS

The above objects and other advantages of the present invention will become more apparent by describing in detail a preferred embodiment thereof with reference to the attached drawings, in which.

DETAILED DESCRIPTION OF THE INVENTION

Figure 1:
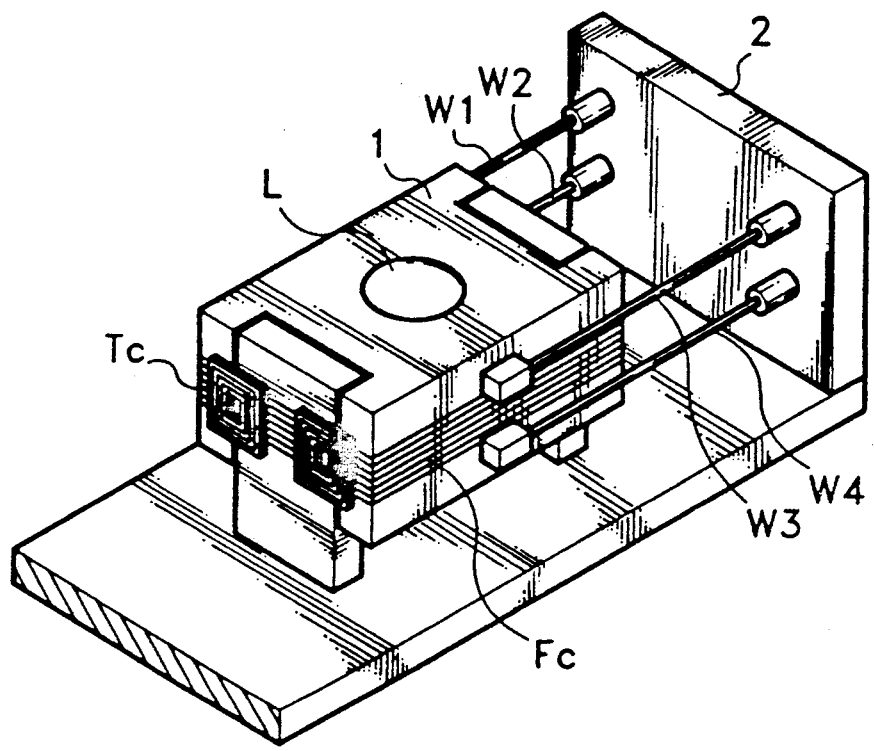
FIG. 1 shows a conventional objective lens driving apparatus.
Figure 2:
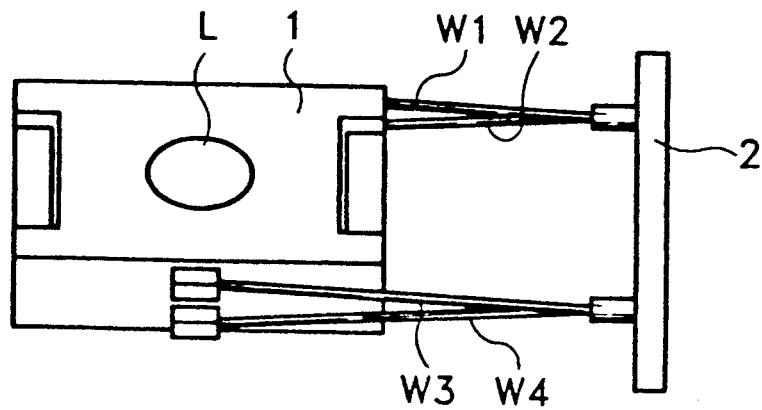
FIG. 2 is a plan view showing a rotated state of the objective lens driving portion of the apparatus shown in FIG. 1, while being deviated from a magnetic field.
Figure 3:
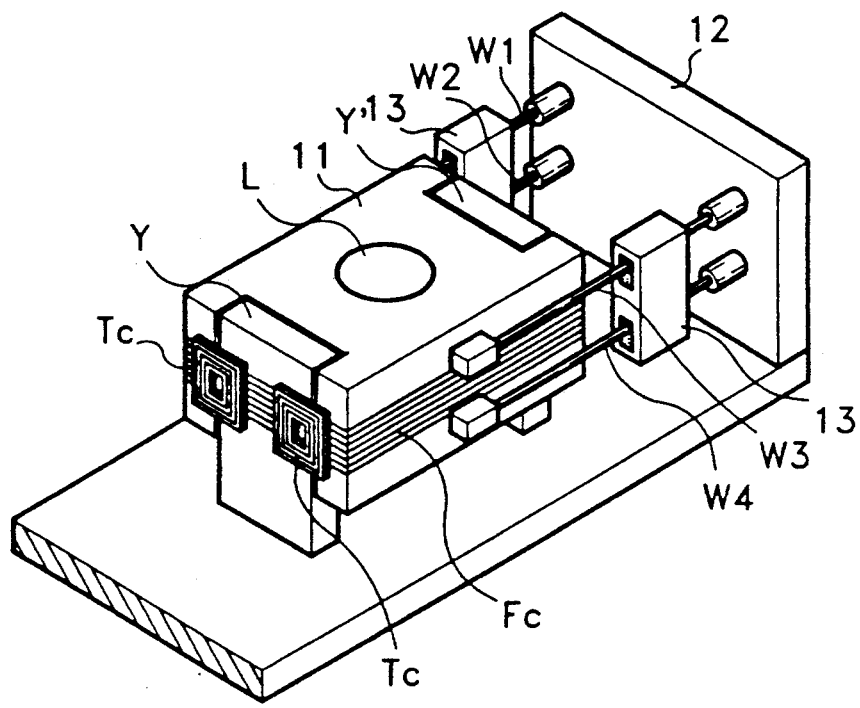
FIG. 3 shows an objective lens driving apparatus according to the present invention.

Referring to FIG. 3, a driving body 11 carrying an objective lens L thereon has magnetic circuit components to execute back and forth movement in the horizontal direction for tracking and in the vertical direction for focusing. In more detail, respective permanent magnets (not shown), outer yokes (not shown), and inner yokes Y and Y' are opposingly installed centered by driving body 11, and tracking coils Tc and focusing coil Fc are attached on driving body 11, so as to oppose the permanent magnets.

Also, for the horizontal and vertical movement of driving body 11, a plurality of elastic linear members $W_1$-$W_4$ are provided for elastically supporting driving body 11 and, at the same time, are supplied with current. These elastic linear members $W_1$-$W_4$ are fixed on a fixing block 12 and on both sides of driving body 11.

Figure 4:
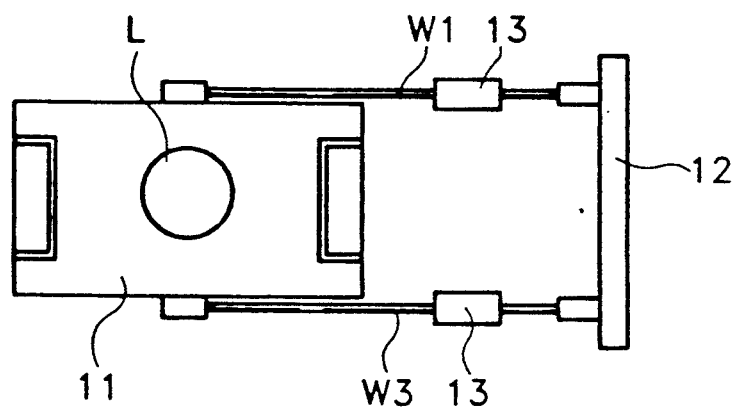
FIG. 4 is a plan view of the apparatus shown in FIG. 3, which shows that the apparatus maintains a balanced state, even though during focusing movement, the objective lens driving body is subjected to a rolling force caused by the deviation from the magnetic field of part of a tracking coil.
Figure 5:
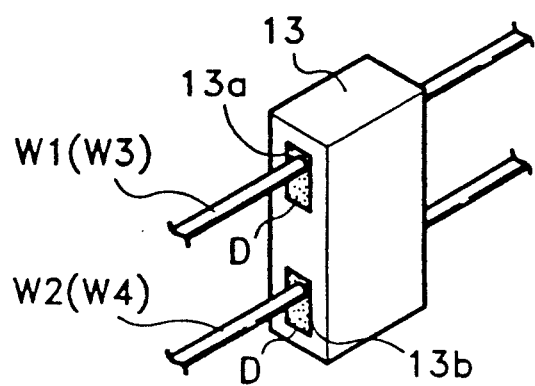
FIG. 5 is a perspective view of a support applied to the objective lens driving apparatus according to the present invention.

As shown in FIGS. 3, 4 and 5, a pair of supports 13 are provided as distinctive elements of the present invention. Here, each support 13, suspended on the center of elastic linear members $W_1$ and $W_2$ or $W_3$ and $W_4$, has penetration holes 13a and 13b through which pass a respective elastic linear member which is fixed to one side of driving body 11. Penetration holes 13a and 13b are long enough in the vertical direction of the body of a respective support 13, to allow for the vertical movement of elastic linear members $W_1$-$W_4$ when driving body 11 moves in the vertical direction. In addition to this, the widths of penetration holes 13a and 13b are roughly the same as those of elastic linear members $W_1$-$W_4$, thereby creating a sliding movement under an appropriate frictional force. Penetration holes 13a and 13b are filled with a jelly-type damper D, and preferably, support 13 should be nonconductive.

Figure 6A:
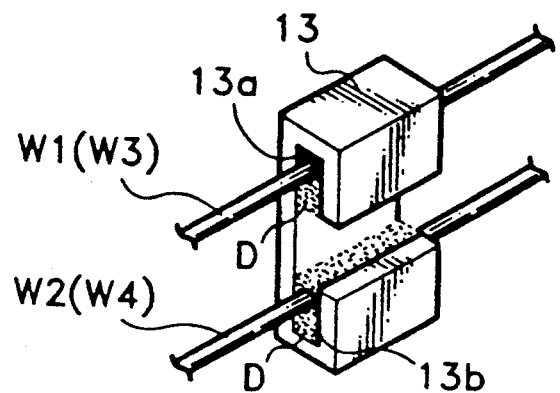
FIGS. 6A, 6B and 6C illustrate other embodiments of the support applied to the objective lens driving apparatus according to the present invention.
Figure 6B:
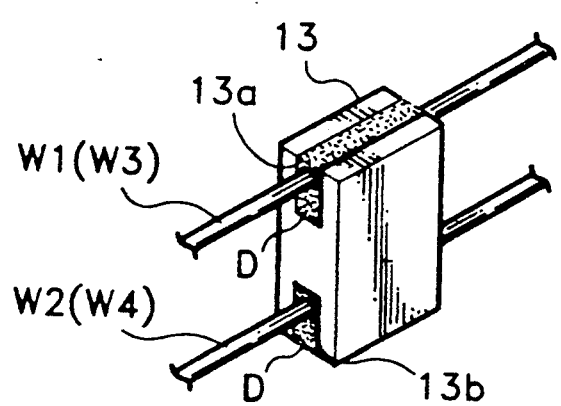
Figure 6C:
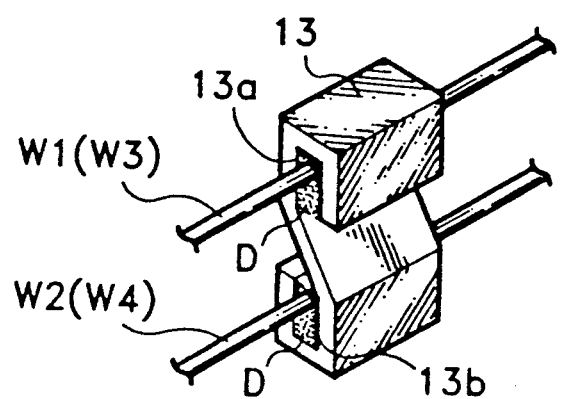

FIGS. 6A, 6B and 6C illustrate other embodiments of support 13 according to the present invention. Here too, the widths of respective penetration holes 13a and 13b through which pass elastic linear members $W_1$-$W_4$ are roughly the same as those of the elastic linear members to establish an appropriate frictional force between them, and the jelly-type damper D fills in penetration holes 13a and 13b.

In the objective lens driving apparatus constructed as above, when current is applied to focusing coil Fc via elastic linear members $W_1$-$W_4$, movement in the vertical direction is induced for focusing movement of the objective lens driving body 11. At this time, tracking coil Tc partially deviates from the influence of the magnetic field, which creates differing electrical forces between the upper and lower portions, so that driving body 11 is likely to move falsely. However, while carrying out focusing operations, the objective lens driving apparatus of the present invention does not roll and maintains a stable, balanced state.

This is accomplished by means of supports 13 (whose operation will be later described in detail), which are suspended by elastic linear members $W_1$ to $W_4$. Even if, as described above, a difference of electromagnetic force occurs between the upper and lower parts of driving body 11 due to the focusing movement thereof (thus twisting the plurality of elastic linear members elastically supporting the main body the friction occurring in the inner walls of penetration holes 13a and 13b of support 13 offsets the twisting force created in elastic linear members $W_1$ to $W_4$, to prevent driving body 11 from rotating. Damping material D, fills in penetration holes 13a and 13b absorbs any abnormal vibrations due to external impacts to contribute to the precise servo of driving body 11, as well as functions to suppress the twisting action of elastic linear members $W_1$ to $W_4$.

Similar to the above embodiment, the other embodiments of the present invention shown in FIGS. 6A, 6B and 6C can also offset the twisting action of elastic linear members $W_1$ to $W_4$, using the friction between the inner walls of penetration holes 13a and 13b and elastic linear members $W_1$ to $W_4$, to obtain an object of the present invention.

As described above, the objective lens driver of the present invention has supports 13 for preventing the twisting action of elastic linear members $W_1$ to $W_4$, thus preventing the rotation of driving body 11. Different from the conventional driver which, in order to prevent the rotation of driving body 11, has a complicated tracking coil structure increasing cost and consuming much power, the present invention has a simplified tracking coil structure so that, even if driving body 11 is induced to rotate due to the difference of electromagnetic force between the upper and lower parts of the tracking coil, the twisting action of elastic linear members $W_1$ to $W_4$ can be prevented, to enable servo control while the driving body stays stable. With tracking coils of various form, the present invention can thoroughly prevent the rotation of the driving body mounted with an objective lens, so as to constantly allow precise servo control thereof.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. An objective lens driving apparatus designed to minimize rolling effects of an optical pick-up driven in a horizontal and vertical direction with an objective lens installed on a driving body having a first and a second opposing side, comprising:

a fixed body;

first elastic member means disposed in a horizontal direction, having a first end connected to said fixed body and a second end connected to said first side of said driving body, for supporting said driving body;

second elastic member means disposed in a horizontal direction, having a first end connected to said fixed body and a second end connected to said first side of said driving body, for supporting said driving body;

third elastic member means disposed in a horizontal direction, having a first end connected to said fixed body and a second end connected to said second opposing side of said driving body, for supporting said driving body;

fourth elastic member means disposed in a horizontal direction, having a first end connected to said fixed body and a second end connected to said second opposing side of said driving body, for supporting said driving body;

first inelastic support means located between said fixed body and said driving body, having a first channel for accommodating said first elastic member means and a second channel for accommodating said second elastic member means, said first channel having a height greater than a corresponding dimension of said first elastic member means and a first gap formed as a result of said first channel having a height greater than a corresponding dimension of said first elastic member means, and said second channel having a height greater than a corresponding dimension of said second elastic member means and a second gap formed as a result of said second channel having a height greater than a corresponding dimension of said second elastic member means;

second inelastic support means located between said fixed body and said driving body, having a third channel for accommodating said third elastic member means and a fourth channel for accommodating said fourth elastic member means, said third channel having a height greater than a corresponding dimension of said third elastic member means and a third gap formed as a result of said third channel having a height greater than a corresponding dimension of said third elastic member means, and said fourth channel having a height greater than a corresponding dimension of said second elastic member means and a fourth gap formed as a result of said fourth channel having a height greater than a corresponding dimension of said fourth elastic member means; and damping material for filling said first, second, third and fourth gaps.

2. An objective lens driving apparatus for moving an objective lens of an optical pickup in a first direction parallel to a surface of an optical recording medium and a second direction parallel to an axis of rotation of the optical recording medium, said objective lens driving apparatus comprising:

a driving body holding the objective lens, for moving the objective lens in said first and second directions;

a fixed body;

first elastic member means disposed in said first direction and having a first end connected to said fixed body and a second end connected to a first side of said driving body, for supporting said driving body;

second elastic member means disposed in said first direction and having a first end connected to said fixed body and a second end connected to said first side of said driving body, for supporting said driving body;

third elastic member means disposed in said first direction and having a first end connected to said fixed body and a second end connected to a second side of said driving body opposite said first side, for supporting said driving body;

fourth elastic member means disposed in said first direction and having a first end connected to said fixed body and a second end connected to said second side of said driving body, for supporting said driving body; and first inelastic support means having a first channel for accommodating said first elastic member means and a second channel for accommodating said second elastic member means, for preventing rolling of said driving body, said first channel and said second channel having widths dimensioned to provide frictional engagement with said first elastic member means and said second elastic member means, respectively, in said first direction, and heights of said first channel and said second channel, respectively, dimensioned to allow free movement of said first elastic member means and said second elastic member means, respectively, within said first channel and said second channel in said second direction.

3. The objective lens driving apparatus as claimed in claim 2, further comprising:

second inelastic support means having a third channel for accommodating said third elastic member means and a fourth channel for accommodating said fourth elastic member means, for preventing rolling of said driving body, said third channel and said fourth channel having widths dimensioned to provide frictional engagement with said third elastic member means and said fourth elastic member means, respectively, in said first direction and heights of said third channel and said fourth channel dimensioned to allow free movement of said third elastic member means and said fourth elastic member means, respectively, within said third channel and said fourth channel in said second direction.

4. The objective lens driving apparatus as claimed in claim 3, further comprising:

damping material located within said first through fourth channels for damping motion of said first through fourth elastic member means, respectively.

5. The objective lens driving apparatus as claimed in claim 2, further comprising:

damping material located within said first channel and said second channel, for damping motion of said first elastic member means and said second elastic member means, respectively.

6. An objective lens driving apparatus for moving an objective lens of an optical pickup in a first direction parallel to a surface of an optical recording medium and a second direction parallel to an axis of rotation of the optical recording medium and for minimizing rolling effects of an objective lens driving portion holding said objective lens, wherein the objective lens reproduces information from an optical recording medium, said objective lens driving apparatus comprising:

a fixed body;

first and second elastic member means disposed in a direction parallel to a surface of the optical recording medium, each of said first and second elastic member means having a first end connected to a first side of the optical lens driving portion and a second end connected to said fixed body, for carrying current to a focusing coil wrapped around a periphery of the optical lens driving portion, and for supporting the optical lens driving portion;

third and fourth elastic member means disposed in a direction parallel to a surface of the optical recording medium, each of said third and fourth elastic member means having a first end connected to a second side of the optical lens driving portion opposite said first side and a second end connected to said fixed body, for carrying current to the focusing coil wrapped around said periphery of the optical lens driving portion, and for supporting the optical lens driving portion; and first inelastic support means having a first channel having first interior walls, for accommodating said first elastic member means, and having a second channel having second interior walls, for accommodating said second elastic member means, said first inelastic support means for preventing rolling of the optical lens driving portion, a width of each one of said first channel and said second channel being dimensioned to provide frictional engagement in said first direction between said first interior walls of said first channel and said first elastic member means and between said second interior walls of said second channel and said second elastic member means, respectively, and said heights of said first channel and said second channel, respectively, being dimensioned to allow free movement of said first elastic member means and said second elastic member means, respectively, within sddaid first channel and said second channel in said second direction.

7. The objective lens driving apparatus as claimed in claim 6, further comprising:
second inelastic support means having a third channel having third interior walls, for accommodating said third elastic member means, and having a fourth channel having fourth interior walls, for accommodating said fourth elastic member means, said second inelastic support means for preventing rolling of the optical lens driving portion, a width of each one of said third channel and said fourth channel being dimensioned to provide frictional engagement in said first direction between said third interior walls of said third channel and said third elastic member means and between said fourth interior walls of said fourth channel and said fourth elastic member means, respectively, and said heights of said third channel and said fourth channel, respectively, being dimensioned to allow free movement of said third elastic member means and said fourth elastic member means, respectively, within said third channel and said fourth channel in said second direction.

8. The objective lens driving apparatus as claimed in claim 7, further comprising:
damping material for filling portions of said first through fourth channels not occupied by said first through fourth elastic member means, respectively.

9. The objective lens driving apparatus as claimed in claim 6, further comprising:
damping material for filling portions of said first and second channels not occupied by said first and second elastic member means, respectively.

10. An objective lens driving apparatus for moving an objective lens of an optical pickup in a first direction parallel to a surface of an optical recording medium and a second direction parallel to an axis of rotation of the optical recording medium and for minimizing rolling effects of an objective lens driving portion holding said objective lens, wherein the objective lens reproduces information from an optical recording medium, said objective lens driving apparatus comprising:
a fixed body;
first and second elastic member means disposed in a direction parallel to a surface of the optical recording medium, each of said first and second elastic member means having a first end connected to a first side of the optical lens driving portion and a second end connected to said fixed body, for carrying current to a focusing coil wrapped around a periphery of the optical lens driving portion, and for supporting the optical lens driving portion;
third and fourth elastic member means disposed in a direction parallel to a surface of the optical recording medium, each of said third and fourth elastic member means having a first end connected to a second side of the optical lens driving portion opposite said first side and a second end connected to said fixed body, for carrying current to the focusing coil wrapped around said periphery of the optical lens driving portion, and for supporting the optical lens driving portion;
first inelastic support means having a first channel having first interior walls for accommodating said first elastic member means, and having a second channel having second interior walls for accommodating said second elastic member means, said first inelastic support means for preventing rolling of the optical lens driving portion;
a width of each one of said first channel and said second channel being dimensioned to provide frictional engagement in said first direction between said first interior walls of said first channel and said first elastic member means and between said second interior walls of said second channel and said second elastic member means, respectively; and
said heights of said first channel and said second channel, respectively, being dimensioned to allow free movement of said first elastic member means and said second elastic member means, respectively, within said first channel and said second channel in said second direction.

11. The objective lens driving apparatus as claimed in claim 10, further comprising:
second inelastic support means having a third channel having third interior walls for accommodating said third elastic member means, and having a fourth channel having fourth interior walls for accommodating said fourth elastic member means, said second inelastic support means for preventing rolling of the optical lens driving portion;
a width of each one of said third channel and said fourth channel being dimensioned to provide frictional engagement in said first direction between said third interior walls of said third channel and said third elastic member means and between said fourth interior walls of said fourth channel and said fourth elastic member means, respectively; and
said heights of said third channel and said fourth channel, respectively, being dimensioned to allow free movement of said third elastic member means and said fourth elastic member means, respectively, within said third channel and said fourth channel in said second direction.

* * * * *

UNITED STATES PATENT AND TRADEMARK OFFICE
CERTIFICATE OF CORRECTION

PATENT NO. : 5,323,369
DATED : 21 June 1994
INVENTOR(S) : Chun- Dong Kim

It is certified that error appears in the above-indentified patent and that said Letters Patent is hereby corrected as shown below:

Column 1,

Line 56 and 59, Change "tracing" to --tracking--;

Column 7

Line 3    Change "sddaid" to --said--:

Signed and Sealed this

Fifteenth Day of October, 1996

*Attest:*

BRUCE LEHMAN

*Attesting Officer*    Commissioner of Patents and Trademarks